US 12,340,599 B2

(12) United States Patent
Kawaharada et al.

(10) Patent No.: US 12,340,599 B2
(45) Date of Patent: Jun. 24, 2025

(54) IMAGE PROCESSING DEVICE AND IMAGE PROCESSING METHOD

(71) Applicant: TOYOTA JIDOSHA KABUSHIKI KAISHA, Toyota (JP)

(72) Inventors: Makoto Kawaharada, Susono (JP); Kohtaroh Nagaoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/213,462

(22) Filed: Jun. 23, 2023

(65) Prior Publication Data

US 2024/0087338 A1  Mar. 14, 2024

(30) Foreign Application Priority Data

Sep. 14, 2022  (JP) .................................. 2022-146301

(51) Int. Cl.
*G06V 20/59* (2022.01)
*G06F 3/01* (2006.01)

(52) U.S. Cl.
CPC .............. *G06V 20/59* (2022.01); *G06F 3/013* (2013.01)

(58) Field of Classification Search
CPC ........ G06F 3/013; G06V 20/58; G06V 20/59; G06V 20/597; G06V 40/193
See application file for complete search history.

(56) References Cited

U.S. PATENT DOCUMENTS

| 10,427,689 | B2  | 10/2019 | Tokimasa et al. |
| 10,486,698 | B2  | 11/2019 | Masui et al. |
| 10,731,996 | B2  | 8/2020  | Naito |
| 10,843,628 | B2* | 11/2020 | Kawamoto .......... H04N 23/698 |
| 10,922,561 | B2  | 2/2021  | Ozawa et al. |
| 11,017,247 | B2  | 5/2021  | Hayashi et al. |
| 11,072,328 | B2  | 7/2021  | Masui et al. |
| 11,235,766 | B2  | 2/2022  | Masui et al. |
| 11,247,671 | B2  | 2/2022  | Komori |
| 2019/0075253 | A1* | 3/2019  | Wada ...................... H04N 23/63 |
| 2019/0188506 | A1* | 6/2019  | Siboni .................... G02B 27/01 |
| 2020/0326191 | A1  | 10/2020 | Naito |
| 2021/0364631 | A1  | 11/2021 | Hasegawa et al. |
| 2023/0009479 | A1* | 1/2023  | Suzuki .................. G06V 10/26 |

FOREIGN PATENT DOCUMENTS

| JP | 2016170688 A  | * | 9/2016 |
| JP | 2019-207541   |   | 12/2019 |
| JP | 2020-95544 A  |   | 6/2020 |
| JP | 2020095544    | * | 6/2020 |
| JP | 2021-89616 A  |   | 6/2021 |
| WO | WO-2020183652 A1 | * | 9/2020 |

\* cited by examiner

*Primary Examiner* — Shahan U R Rahaman
*Assistant Examiner* — Mohammed S Rahaman
(74) *Attorney, Agent, or Firm* — Sughrue Mion, PLLC

(57) ABSTRACT

The image processing device includes an acquisition unit that acquires a front image obtained by capturing the front of the vehicle with an in-vehicle front camera and acquires an in-vehicle image obtained by capturing the driver with an in-vehicle camera, a line of sight detection unit that detects a line of sight direction of the driver based on the in-vehicle image, a setting unit that sets a clipping area in which a part of the front image is clipped based on the detected line-of-sight direction of the driver, and a recognition processing unit that executes image recognition processing in the set clipping area. The setting unit sets the clipping area in an area deviated from the line of sight direction of the driver in the front image.

4 Claims, 3 Drawing Sheets

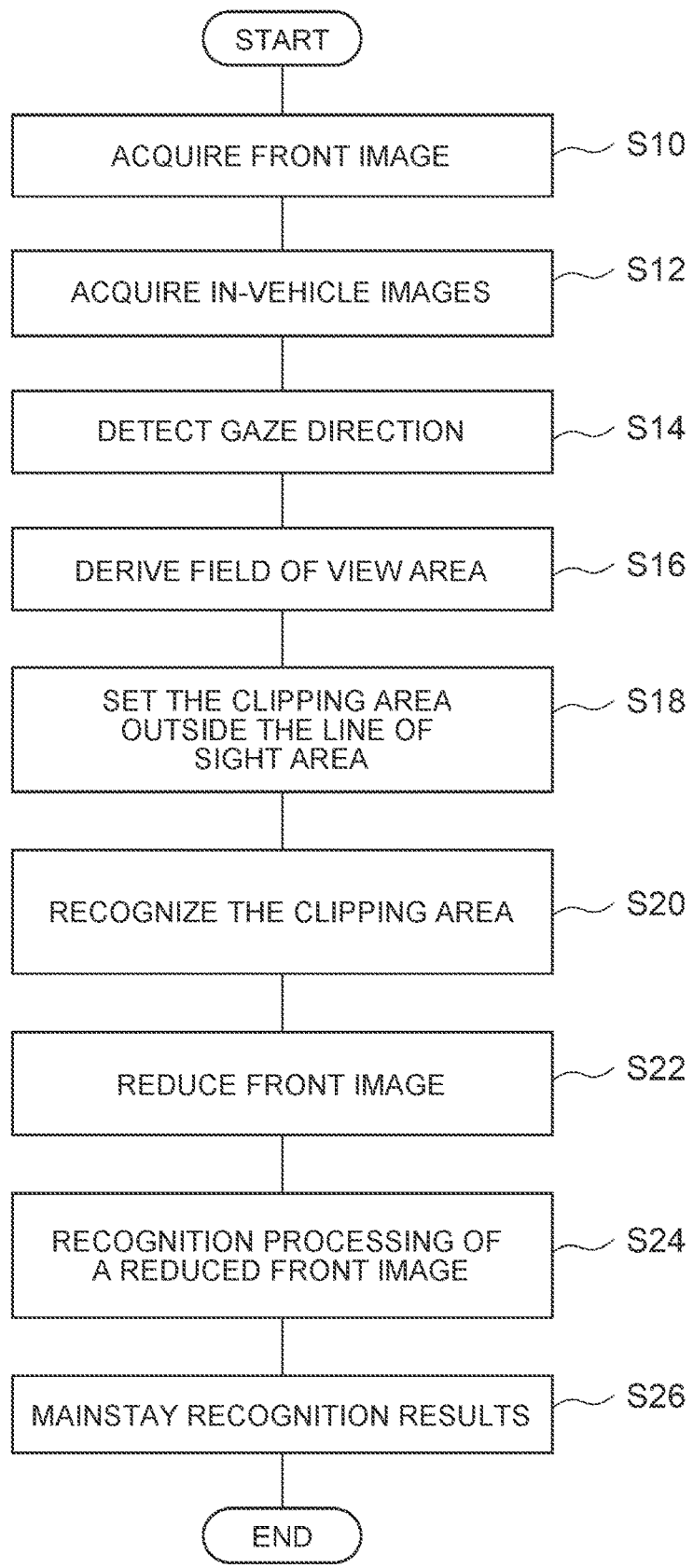

IMAGE PROCESSING DEVICE AND IMAGE PROCESSING METHOD

CROSS-REFERENCE TO RELATED APPLICATION

This application claims priority to Japanese Patent Application No. 2022-146301 filed on Sep. 14, 2022, incorporated herein by reference in its entirety.

BACKGROUND

1. Technical Field

The present disclosure relates to a technique for reducing an amount of data of an image used for recognition processing.

2. Description of Related Art

Japanese Unexamined Patent Application Publication No. 2019-207541 (JP 2019-207541 A) discloses an image processing device including: an image clipping unit that clips a part of an entire image including an entire subject among images captured by a camera mounted on a vehicle; an image reduction unit that reduces an entire image among images captured by the camera to generate a reduced image; a first image recognition unit that recognizes a part of the image clipped by the image clipping unit; a second image recognition unit that recognizes the reduced image reduced by the image reduction unit; and an image recognition result integration unit that integrates a first recognition result recognized by the first image recognition unit and a second recognition result recognized by the second image recognition unit and that generates information of the integrated recognition result. This image clipping unit clips a part of the entire image from a cuttable range located at s central portion of the entire image.

SUMMARY

In the technique described in JP 2019-207541 A, a central portion of an entire image is clipped and used for recognition processing. However, since a driver basically looks forward during driving, the driver often already recognizes the clipped central portion.

An object of the present disclosure is to provide a technique for clipping an area in which the driver's attention can be reduced from a front image and using the area for recognition processing.

In order to solve the above issue, an image processing device according to an aspect of the present disclosure includes:
- an acquisition unit that acquires a front image in which an image of an area in front of a vehicle is captured by an in-vehicle front camera, and that acquires an in-vehicle image in which an image of a driver is captured by an in-vehicle camera;
- a line of sight detection unit that detects a line of sight direction of the driver based on the in-vehicle image;
- a setting unit for setting a clipping area obtained by clipping a part of the front image based on the line of sight direction of the driver that has been detected; and
- a recognition processing unit for executing an image recognition process on the clipping area that has been set, in which the setting unit sets the clipping area in an area deviated from the line of sight direction of the driver in the front image.

Another aspect of the present disclosure is an image processing method. The method is an image processing method in which a computer executes steps, and includes
- a step of acquiring a front image in which an image of an area in front of a vehicle is captured by an in-vehicle front camera, and that acquires an in-vehicle image in which an image of a driver is captured by an in-vehicle camera;
- a step of detecting a line of sight direction of the driver based on the in-vehicle image;
- a step of setting a clipping area obtained by clipping a part of the front image based on the line of sight direction of the driver that has been detected; and
- a step of executing an image recognition process on the clipping area that has been set, in which in the step of setting the clipping area, the clipping area is set in an area deviated from the line of sight direction of the driver in the front image.

According to the present disclosure, it is possible to provide a technique for clipping the area in which the driver's attention can be reduced from the front image and using the area for recognition processing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart of image recognition processing executed by the image processing device.

DETAILED DESCRIPTION OF EMBODIMENTS

Figure 1:
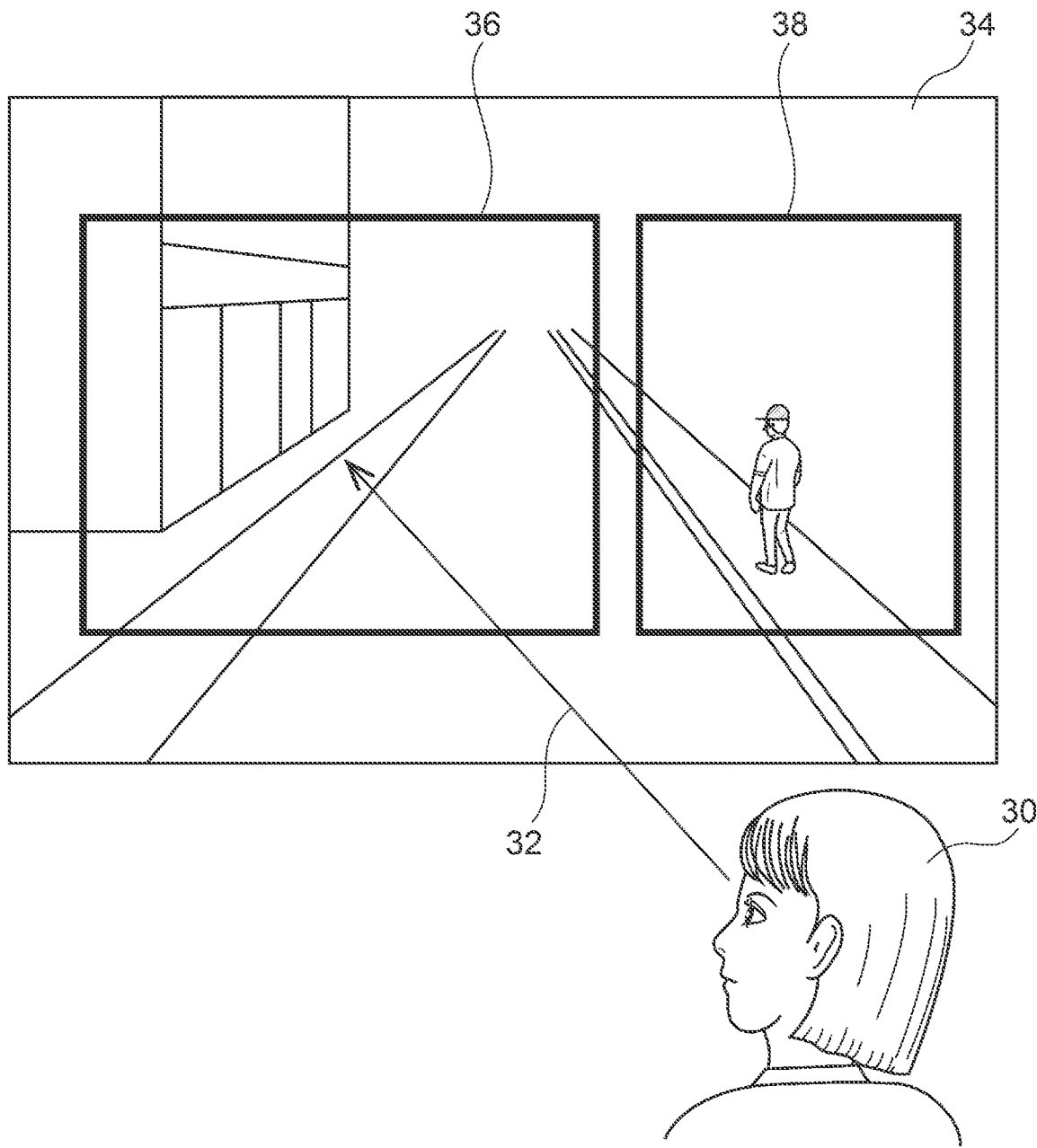
FIG. 1 is a view showing a state in which a driver looks outside the vehicle from inside the vehicle through a windshield.

FIG. 1 shows a state in which the driver 30 looks out of the vehicle from the inside of the vehicle through the windshield 34. The surrounding situation through the windshield 34 shown in FIG. 1 is captured by the front camera and acquired as a front image. The acquired front image is used for image recognition processing in order to detect an obstacle that may be an obstacle to travel.

In the image recognition processing, since a load is applied when the front image is used as it is, it is preferable to reduce the amount of data used for the image recognition processing by processing the front image. Therefore, the image processing device according to the embodiment executes the recognition processing using the image obtained by cutting out a part of the front image and reducing the amount of data, and in particular, cuts out an area not seen by the driver 30 and executes the recognition processing. The recognition processing result may be used, for example, in automatic driving control.

In FIG. 1, the line-of-sight direction 32 of the driver 30 is directed to the left, and the field of view area 36 of the driver 30 is biased to the left. At this time, since the driver 30 is gazing at the left side, there is a possibility that the attention on the right side is deteriorated. Therefore, the image processing device of the embodiment generates the clipping area 38 in which the region not seen by the driver 30 is cut out, and executes the recognition process on the clipping area 38. Thus, the load of the image recognition processing is reduced.

Figure 2:
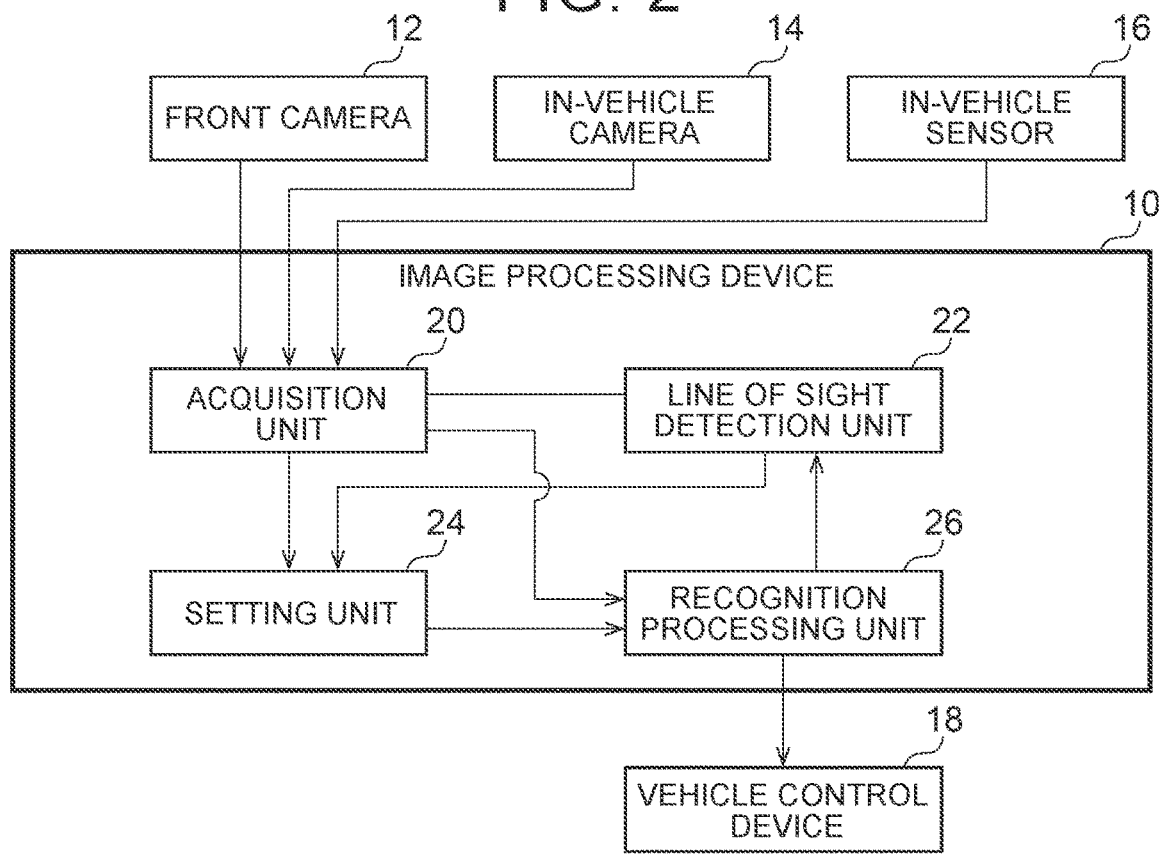
FIG. 2 is a diagram illustrating a functional configuration of an image processing system.

FIG. 2 is a diagram illustrating a functional configuration of the image processing system 1. The functions of the image-processing system 1 may be implemented by an LSI such as a circuit block, a memory, or the like in terms of hardware, and may be implemented by system software or an application program loaded in a memory in terms of software. Therefore, it will be understood by those skilled in the art that each function of the image processing system 1 can be realized in various forms by only hardware, only software, or a combination thereof, and is not limited to any one of them.

The image processing system 1 includes an image processing device 10, a front camera 12, an in-vehicle camera 14, an in-vehicle sensor 16, and a vehicle control device 18. The image processing device 10 includes an acquisition unit 20, a line of sight detection unit 22, a setting unit 24, and a recognition processing unit 26.

The front camera 12 captures an image of the front of the vehicle to generate a front image, and sends the front image to the image processing device 10. The in-vehicle camera 14 captures an image of a driver in the vehicle to generate an in-vehicle image, and sends the in-vehicle image to the image processing device 10.

The in-vehicle sensor 16 may be an acceleration sensor for detecting an acceleration of the vehicle, an inclination sensor for detecting an inclination of the road surface, a steering angle sensor for detecting a turning angle, or the like, detects a traveling state of the vehicle, and sends the detected traveling state information to the image processing device 10.

The vehicle control device 18 controls the traveling of the vehicle based on the information of the obstacle or the traffic sign recognized by the image processing device 10. For example, the vehicle control device 18 performs control for avoiding a collision with an obstacle or performs control for causing a vehicle to travel in accordance with a traffic sign.

The acquisition unit 20 of the image processing device 10 acquires a front image from the front camera 12, an in-vehicle image from the in-vehicle camera 14, and traveling state information from the in-vehicle sensor 16.

The line of sight detection unit 22 analyzes the in-vehicle image and detects the line-of-sight direction of the driver. The line of sight detection unit 22 calculates the direction of the driver's face and the position of the pupil in the eye based on the in-vehicle image. The line of sight detection unit 22 detects the line-of-sight direction of the driver based on the direction of the face and the position of the pupil in the eye. The line of sight detection unit 22 detects the line-of-sight direction of the driver by a vector extending from the eye with the center of both eyes as a starting point. The direction of the driver's face is calculated based on the position of the face part from the center of the face.

The setting unit 24 sets a clipping area in which a part of the front image is cut out based on the line-of-sight direction of the driver detected by the line of sight detection unit 22. The setting unit 24 sets the clipping area in a region deviated from the line-of-sight direction 32 of the driver 30 in the front image.

The setting unit 24 derives a field of view area viewed by the driver 30 based on the line-of-sight direction 32 of the driver 30, and sets a clipping area in a region deviated from the field of view area. A method of setting the clipping area will be described with reference to a new drawing.

Figure 3:
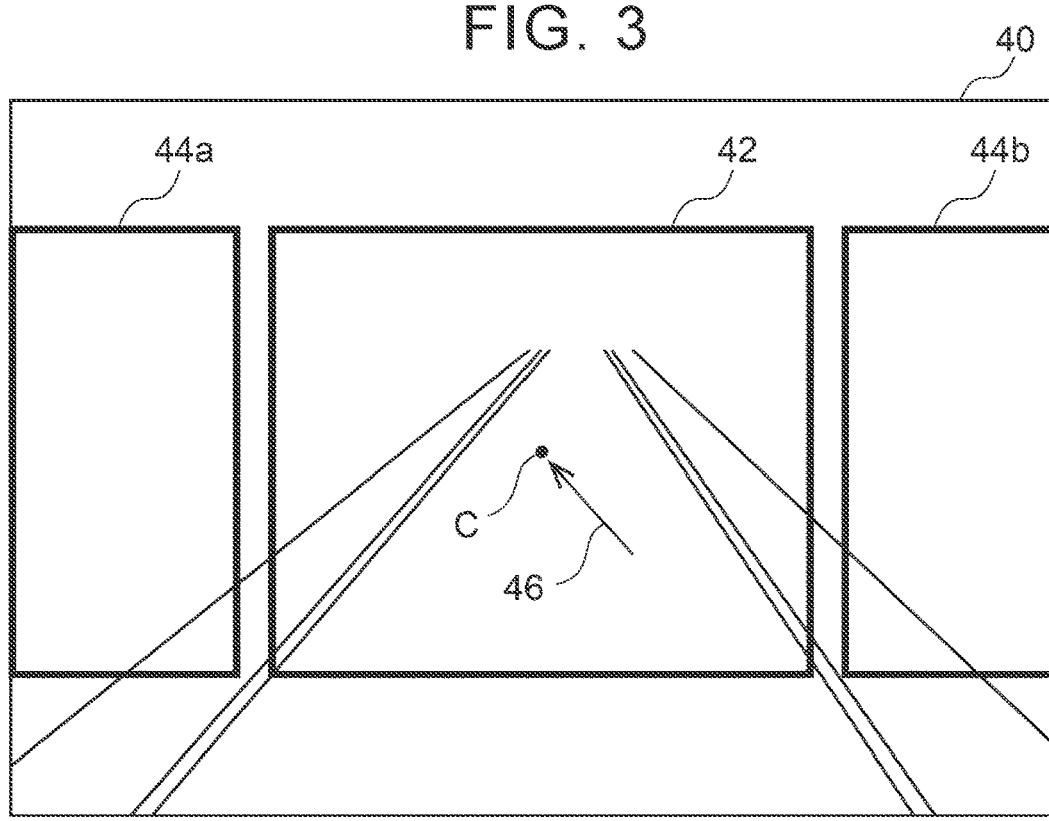
FIG. 3 is a diagram illustrating a front image including a field of view area and a clipping area.

FIG. 3 shows a front image 40 including a field of view area 42 and a clipping area 44a,44b. In the example illustrated in FIG. 3, the driver 30 is driving facing the front, and the line-of-sight direction 46 is facing the center of the front image 40. The setting unit 24 derives the field of view area 42 based on the line-of-sight direction 46. A position passing through the vector indicated by the line-of-sight direction 46 is set at the center C of the field of view area 42. The setting unit 24 may hold a table for calculating coordinates at which a vector that is the line-of-sight direction 46 passes through the front image 40. The size of the field of view area 42 is set according to the human viewing angle, and may be set based on an experiment or the like.

The setting unit 24 sets the clipping area 44a,44b by shifting from the field of view area 42. The clipping area 44a,44b illustrated in FIG. 3 does not overlap with the field of view area 42, but is disposed outside the field of view area 42. Thus, the setting unit 24 can set the outside of the field of view of the driver 30 to the clipping area 44a,44b. Note that the clipping area 44a,44b may partially overlap the field of view area 42. However, at least half or more of the area of the clipping area 44a,44b is set to be shifted from the field of view area 42 so as not to overlap with the field of view area 42.

The size of the clipping area 44a,44b, that is, the area on the front-side images is set in advance. The upper limit of the size of the clipping area 44a,44b is determined by the transfer rate to the recognition processing unit 26, and may be determined by the performance of the hardware. When the field of view area 42 of the driver 30 is located at the center of the front image 40, the setting unit 24 sets the right region and the left region deviated from the center of the front image 40 to the clipping area 44a,44b. When the driver is driving facing the front, the image processing device 10 pays attention to the left and right.

Incidentally, when the vehicle is traveling on a slope or a curved road, the center position of the front image may deviate from the road to be traveled. The setting unit 24 adjusts the position of the clipping area 44a,44b in the front images 40. The height of the center of the clipping area 44a,44b may be preset as a reference height. The setting unit 24 adjusts the reference height of the clipping area 44a,44b based on the traveling condition data. Accordingly, the clipping area can be appropriately set according to the traveling state of the vehicle.

The size of the clipping area may vary depending on the position and movement of the obstacle. For example, in a case where it is recognized that the obstacle is located or approaching in the traveling direction of the vehicle by the image processing up to the previous time, the setting unit 24 may set the clipping area to be larger than in a case where there is no obstacle. That is, the setting unit 24 sets the size of the clipping area in accordance with the position and movement of the obstacle. The setting unit 24 may indicate the clipping area by coordinates on the front image. When the driver does not face the front, the setting unit 24 sets a region located at the center of the front image w as a clipping area.

The setting unit 24 executes processing for cutting out the cut-out area 44a,44b from the front images 40, and sends the clipping area 44a,44b to the recognition processing unit 26. The clipping area 44a,44b may include information on coordinates in the front images 40. In addition, the setting unit 24 performs a process of reducing the total size of the front image 40 to reduce the amount of data. For example, the setting unit 24 reduces the front image 40 by 1/10 to generate a reduced image.

Return to FIG. 2. The recognition processing unit 26 receives the captured image and performs processing of recognizing an object included in the captured image. The recognition processing unit 26 detects the direction of the driver's face and the position of the pupil in the eye based on the in-vehicle image. The recognition processing unit 26 analyzes the front image and detects an object such as an obstacle or a traffic sign included in the front image.

The recognition processing unit 26 executes image recognition processing on the clipping area set by the setting unit 24, and generates information on the object included in the clipping area. The information about the object includes a type of the object, a positional relationship between the vehicle and the object, and the like. This makes it possible to recognize an area outside the field of view of the driver without reducing the recognition accuracy. Further, the amount of data to be recognized can be reduced by narrowing down to an area outside the field of view of the driver.

The recognition processing unit 26 executes image recognition processing on the reduced image of the front image, and generates information on the object included in the reduced image. The recognition result that overlaps between the clipping area and the reduced region gives priority to the clipping area over the reduced image. The recognition processing unit 26 outputs the recognition result to the vehicle control device 18.

In the modification example, the setting unit 24 may set the clipping area based on the detection result of the side camera. The front camera 12 captures an image of the front of the vehicle, while the side camera captures an image of an area on both sides of the front image. The recognition processing unit 26 analyzes the side image captured by the side camera and tracks the object included in the side image. In a case where it is predicted that the object enters the angle of view of the front camera 12 from the side camera based on the tracking result of the object, the setting unit 24 sets the area where the object enters as the clipping area. That is, when the object enters the angle of view of the front camera 12 from the right side, the setting unit 24 sets the right end region of the front image as the clipping area. When the object enters the angle of view of the front camera 12 from the left side, the setting unit 24 sets the left end region of the front image as the clipping area. Thus, when the object enters the field angle, the recognition processing unit 26 can accurately detect the object.

FIG. 4 is a flowchart of image recognition processing executed by the image processing device 10. The acquisition unit 20 acquires a front image from the front camera 12 (S10) and acquires an in-vehicle image from the in-vehicle camera 14 (S12). The line of sight detection unit 22 detects the line-of-sight of the driver based on the in-vehicle images (S14). Note that the recognition processing unit 26 may analyze the in-vehicle image to detect the positions of the pupils in the driver's face, eyes, and eyes, respectively, and the line of sight detection unit 22 may detect the line of sight direction of the driver based on the detection result.

The setting unit 24 derives a field of view area in the front image based on the line-of-sight direction detected by the line of sight detection unit 22 (S16). The setting unit 24 sets a clipping area outside the field of view area in the front images (S18). The setting unit 24 cuts out the set clipping area from the front image and sends it to the recognition processing unit 26, and the recognition processing unit 26 executes the image recognition processing on the clipping area (S20).

The setting unit 24 reduces the entire front image to generate a reduced image (S22), and the recognition processing unit 26 performs recognition processing on the reduced image (S24). The recognition processing unit 26 integrates the recognition result of the clipping area and the recognition result of the reduced image so as to prioritize the recognition result of the clipping area, generates a recognition result, and outputs the recognition result to the vehicle control device 18 (S26).

The present disclosure has been described above based on examples. The present disclosure is not limited to the above-described embodiments, and various modifications such as design changes can be made based on knowledge of a person skilled in the art.

What is claimed is:

1. An image processing device comprising:
an integrated circuit configured to:
acquire a front image in which an image of an area in front of a vehicle is captured by an in-vehicle front camera, and acquire an in-vehicle image in which an image of a driver is captured by an in-vehicle camera;
detect a line of sight direction of the driver based on the in-vehicle image;
derive a field of view area viewed by the driver based on the line of sight direction of the driver;
set a clipping area obtained by clipping a part of the front image based on the line of sight direction of the driver that has been detected, wherein the clipping area is set in an area deviated from the line of sight direction of the driver in the front image and shifted from the field of view area so that at least half of the clipping area does not overlap with the field of view area, wherein when the driver does not face the front of the vehicle, the clipping area is set in an area located at the center of the front image; and
execute an image recognition process on the clipping area that has been set.

2. The image processing device according to claim 1, wherein when the field of view area of the driver is located at a center of the front image, the setting unit sets the clipping area in a right area and a left area that are deviated from the center of the front image.

3. The image processing device according to claim 1, wherein:
the integrated circuit:
acquires traveling state information indicating a traveling state of the vehicle from an in-vehicle sensor; and
adjusts a position of the clipping area in the front image based on the traveling state information.

4. An image processing method in which a computer executes steps comprising:
a step of acquiring a front image in which an image of an area in front of a vehicle is captured by an in-vehicle front camera, and that acquires an in-vehicle image in which an image of a driver is captured by an in-vehicle camera;
a step of detecting a line of sight direction of the driver based on the in-vehicle image;
a step of deriving a field of view area viewed by the driver based on the line of sight direction of the driver;
a step of setting a clipping area obtained by clipping a part of the front image based on the line of sight direction of the driver that has been detected, wherein the clipping area is set in an area deviated from the line of sight direction of the driver in the front image and shifted from the field of view area so that at least half of the clipping area does not overlap with the field of view area, wherein when the driver does not face the front of the vehicle, the clipping area is set in an area located at the center of the front image; and a step of executing an image recognition process on the clipping area that has been set.

* * * * *